INVENTORS:
MICHAEL GRASER, JR.
THOMAS T. TRUE,
BY [signature]
THEIR ATTORNEY.

INVENTORS:
MICHAEL GRASER, JR.
THOMAS T. TRUE,

BY Julius J. Zaskalicky
THEIR ATTORNEY.

INVENTORS:
MICHAEL GRASER, JR.
THOMAS T. TRUE,

BY Julius J. Zaskalicky
THEIR ATTORNEY.

DEFORMABLE MEDIUM COLOR PROJECTION APPARATUS

INVENTORS:
MICHAEL GRASER, JR.
THOMAS T. TRUE,

BY
THEIR ATTORNEY.

INVENTORS:
MICHAEL GRASER, JR.
THOMAS T. TRUE,
BY Julius J. Zaskalicky
THEIR ATTORNEY.

3,429,996

DEFORMABLE MEDIUM COLOR PROJECTION APPARATUS

Michael Graser, Jr., Fayetteville, and Thomas T. True, Camillus, N.Y., assignors to General Electric Company, a corporation of New York Filed Sept. 27, 1965, Ser. No. 490,248
U.S. Cl. 178—7.5 6 Claims
Int. Cl. H04n 5/48, 3/16

The present invention relates to improvements in apparatus for the projection of images of the kind including a viscous light modulating medium deformable into diffraction gratings by charge deposited thereon in accordance with electrical signals corresponding to the images.

In one of its particular aspects the invention relates to the projection of color images using a common area of the viscous light modulating medium and a common electron beam for the production of deformations in the medium for simultaneously controlling the transmission therethrough point by point of the primary color components, in kind and intensity, in a beam of light in response to a plurality of simultaneous occurring electrical signals, each deformation corresponding point by point to the intensity of a respective primary color component of an image to be projected by such beam of light. Such systems provide a number of advantages over conventional systems in which the resultant light output is dependent on the energy in an electron beam and is a small percentage of the limited energy available in an electron beam.

One form of such apparatus comprises a pair of light masks including similar arrays of transparent and opaque portions, a light modulating medium of the character indicated located between the light masks, and a source of light. Such apparatus usually includes the following lens systems.

(1) A first system for directing light from the source through the openings of the first or input one of said masks onto the light modulating medium, (2) A system for imaging the light passed by the transparent portions of the first mask onto corresponding opaque portions of the second or output mask, and (3) A third system for projecting an image of the light modulating medium on a screen.

In the absence of deformations in the modulating medium light from the source is blocked by the output mask and does not reach the screen. When the surface of the light modulating medium is deformed by the deposition of an electron charge pattern thereon in response to electrical signals corresponding to an image to be projected, light incident on the medium is diffracted and passes through the transparent portions in the output mask onto the screen to form an image corresponding to the electrical signals.

In one system for the projection of three primary colors, for example red, blue and green, a plurality of diffraction gratings are formed on the light modulating medium. One set of grating lines are formed parallel to the direction of electron beam scan and the two other diffraction gratings are formed orthogonal thereto. Correspondingly the slots of the input mask and the bars of the output mask associated with the green channel are oriented parallel thereto. Also the slots of the input mask and bars of the output mask associated with the red and blue channels are oriented parallel to the corresponding grating lines and orthogonal to the direction of horizontal beam scan. In the absence of deformations associated with the green channel the slots of green light passing through the light modulating medium are imaged on the bars of the light output mask and no light passes on to the screen. Also in the absence of deformations associated with the red and blue diffraction gratings in the light modulating medium light from the red and blue slots of the input mask are imaged on to corresponding bars of the light output mask and no light passes on to the screen. When deformations are produced in the light modulating medium in response to electrical signals corresponding to the green, red and blue color components deviations are produced in the light incident on the diffraction gratings and are passed onto the screen.

In such a system light filtering and focusing elements direct red and blue light from a source of white light through the light modulating medium onto the appropriate opaque and transparent portions of the light output mask cooperatively associated with the red and blue diffraction gratings formed in the light modulating medium to produce the desired operation explained above and direct green light from the source of white light through the common area of the light modulating medium and onto appropriate opaque and transparent portions which are cooperatively associated with the green diffraction grating formed in the light modulating medium. A single electron beam of substantially constant current is directed onto the light modulating medium and is scanned horizontally and vertically over the active area of the light modulating medium to form a raster thereon. The three diffraction gratings are formed on the raster area by appropriate modulation of the electron beam. The red and blue diffraction gratings may be formed by appropriate velocity modulation of the electron beam in the direction of horizontal scan and the natural grating formed by the horizontal scan of the electron beam serves as the green diffraction grating. In patent application Ser. No. 490,498, filed Sept. 27, 1965, and assigned to the assignee of the present invention it is mentioned that in order to obtain good contrasts and balanced light transmission efficiencies in all of the three color channels of the system that the rise and decay of deformations associated with each of the diffraction gratings should be of comparable magnitude and of the order of a field of scan. Differences in such uniform rise and decay of deformations associated with each of the three diffraction gratings are largely produced by differences in the line to line spacing of the three diffraction gratings. In the aforementioned patent application a solution to the problem is described and claimed in which the line to line spacing of the green diffraction grating is doubled to bring it into correspondence with the line to line spacing of the other two diffraction gratings. When such beam arrangement is utilized to form a green diffraction grating of double line density of a field certain problems arise with respect to obtaining good dark field conditions, i.e., obtaining good blockage of green light in the absence of deformations in the light modulating medium. Such a condition arises from the fact that the two halves of the vertically spread spot beam for producing the grating of twice the density will seldom be precisely balanced over the whole raster. Such errors result in the existence of a residual grating of field line density during dark field conditions. The existence of such a grating permits light to pass through the slots in the output mask with the resultant that a green dark field is produced in which blotches of light appear. The present invention is directed to overcoming such a problem.

In accordance with the present invention the output bars are made sufficiently large to block first order light deviated by the residual grating of field line density and correspondingly the slots are made of sufficient width to pass first and second order light deviated by the diffraction line grating of frame line density. Such an arrangement enables good contrast to be obtained in the projected image and good light transmission efficieny in the green channel.

The novel features believed to be characteristic of the invention are set forth in the appended claims. The invention itself, together with further objects and advantages thereof, may best be understood by the following description taken in connection with the following drawings in which:

Figures 4, 5:
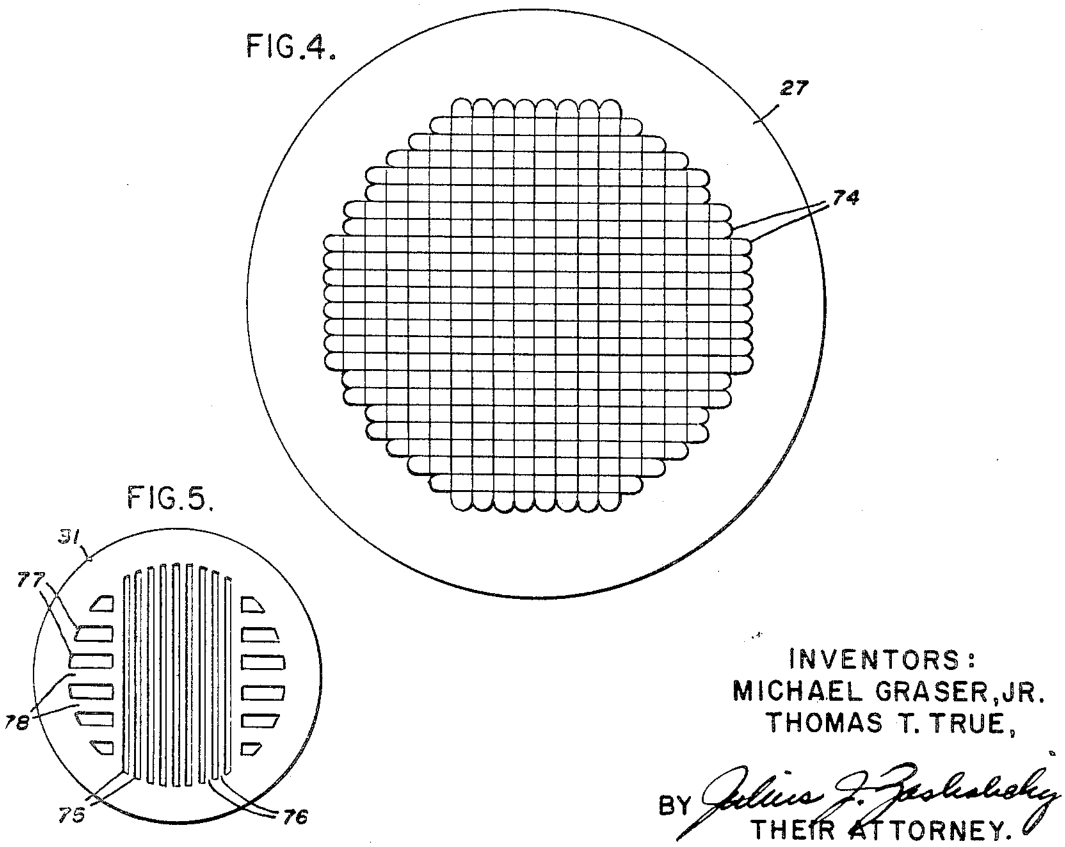
FIGURE 4 is an end view taken along section 4—4 of the system of FIGURE 1 showing the first lenticular lens plate thereof.
FIGURE 5 is an end view taken along section 5—5 of the system of FIGURE 1 showing the light output mask thereof in accordance with the present invention.
Figure 9A:
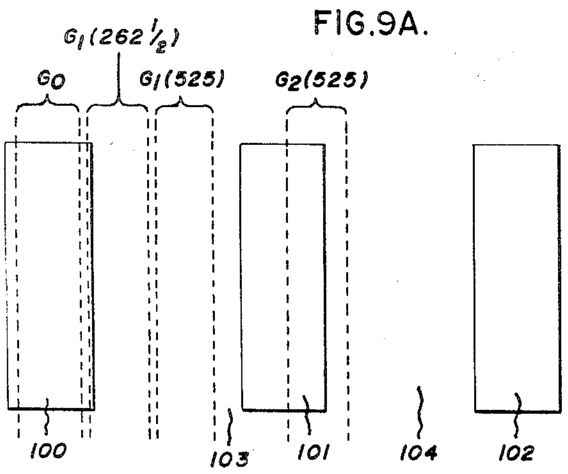
FIGURE 9A shows a diagram of a portion of a side section, including the horizontal slots and bars, of an output mask on which are superimposed various blocks representing various diffraction orders of the green primary color component produced by the green grating for one arrangement of such horizontal slots and bars.
Figure 9B:
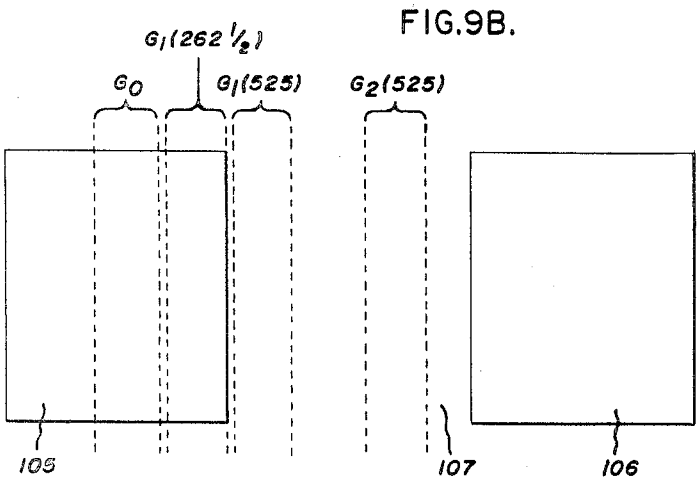

FIGURE 9B also shows a diagram of a portion of the side section, including the horizontal slots and bars, of the output mask of FIGURE 5 on which is superimposed various blocks representing various diffraction orders of the green primary color component produced by the green grating for an arrangement of such horizontal slots and bars in accordance with the present invention.

Figure 1:
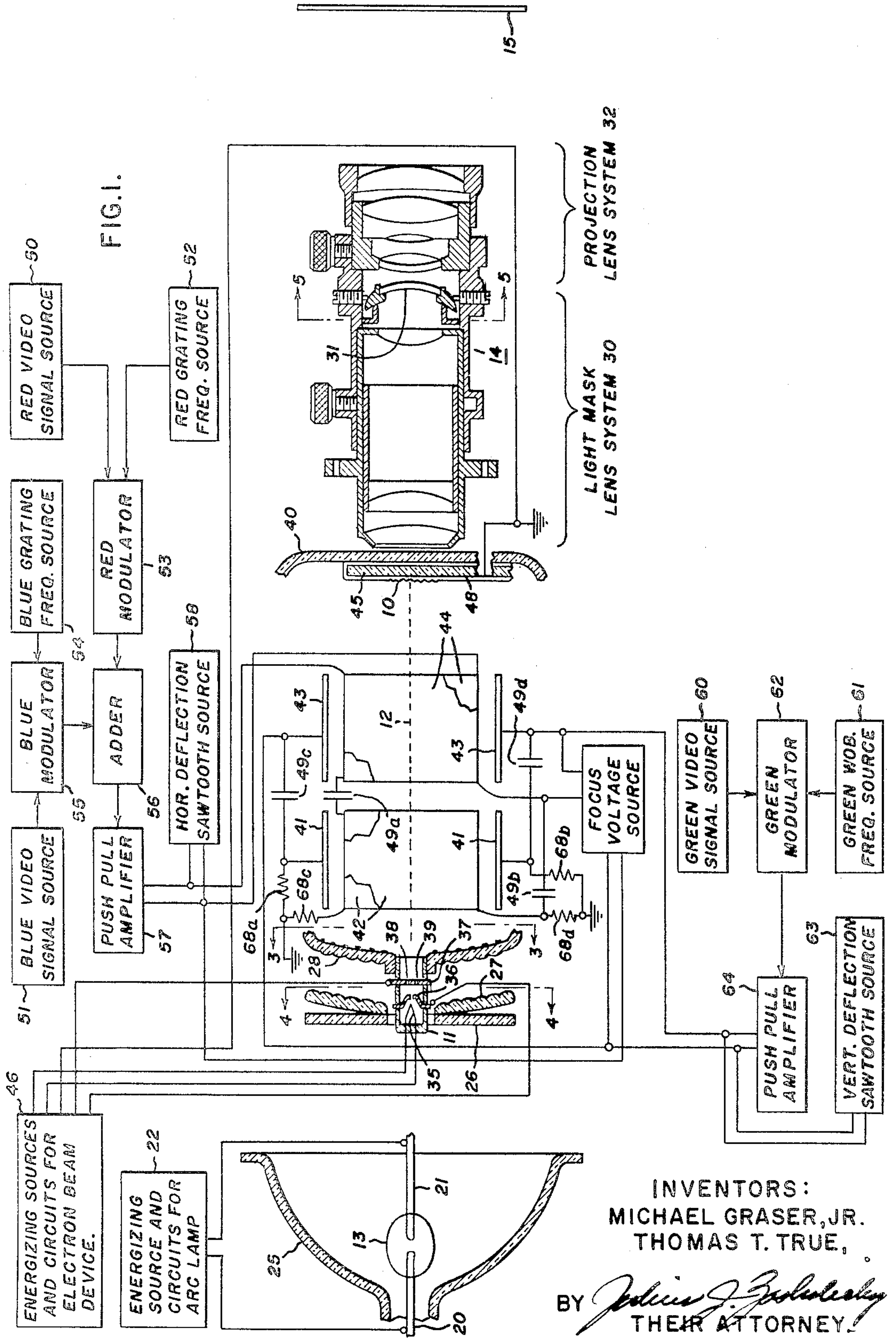
FIGURE 1 is a schematic diagram of the optical and electrical elements of a system useful in explaining the present invention.

Referring to FIGURE 1 there is shown a simultaneous color projection system comprising an optical channel including a light modulating medium 10, and an electrical channel including an electron beam device 11, a beam of electrons 12 consisting of two vertical displaced components of which is coupled to the light modulating medium 10 in the optical channel. Light is applied from a source of light 13 through a plurality of beam forming and modifying elements onto the light modulating medium 10. In the electrical channel electrical signals varying in magnitude in accordance with the point by point variation in intensity in each of the three primary color constituents of an image to be projected are applied to the electron beam device 11 to modulate the beam thereof in the manner to be more fully described below, to produce deformations in the light modulating medium which modify the light transmitted by the modulating medium in point by point correspondence with the image to be projected. An apertured light mask and projection lens system 14, which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in a horizontal and vertical array, a second lens plate and input mask member 28 of generally circular outline also having a plurality of lenticules on one face thereof stacked in horizontal and vertical array, and the input mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally oriented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule on the first plate member onto the active area of the light modulating medium 10. The filter member 26 is constituted of the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, an output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 30 images light from each of the slots in the input mask member 28 onto corresponding opaque bars on the output mask member 31. When the light modulating medium 10 is deformed, light is deflected or deviated by the light modulating medium, passes through the slots in the output mask member 31, and is projected by the projection lens system 32 onto the screen 15. The details of the light input optics of the light valve projection system shown in FIGURE 1 are described in the aforementioned copending patent application Ser. No. 316,606, filed Oct. 16, 1963, and assigned to the assignee of the present invention, now U.S. Patent No. 3,330,908.

The output mask lens system 30 comprises four lens elements which function to image light from the slots in the input mask onto corresponding portions of the output mask in the absence of any physical deformation in the light modulating medium. The projection lens system 32 in combination with the light mask lens system 31 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Ser. No. 336,-505, filed Jan. 8, 1964 and assigned to the assignee of the present invention now U.S. Patent No. 3,328,111.

According to present day color television standards in force in the United States an image to be projected by a television system is scanned horizontally once every 1/15735 of a second by a light-to-electrical signal converter, and vertically at a rate of one field of alternate lines every one-sixtieth of a second. Correspondingly, an electron beam of a light producing or controlling device is caused to move at a horizontal scan frequency of 15,735 cycles per second in synchronism with the scanning of the light converter, and to form thereby images of light varying in intensity in accordance with the brightness of the image to be projected. The pattern of scanning lines, as well as the area of scan, is commonly referred to as the raster.

Figure 2A:
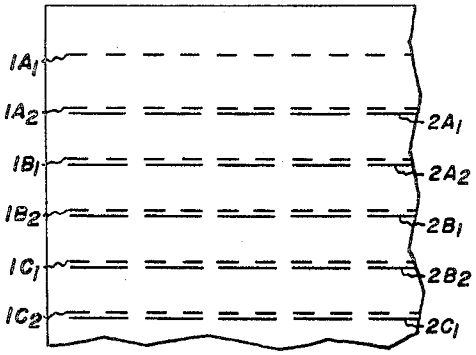
FIGURES 2A through 2C are a diagrammatic representation of the active area of the right modulating medium showing the horizontal scan lines and the location of charge with respect thereto for the various primary color channels of the system.

In FIGURE 2A is shown a section of the raster of the light modulating medium on which the green diffraction grating has been formed. The size of the raster or whole area scanned in the embodiment is approximately 0.82 inch in height and 1.10 inches in width. In this figure are shown the pairs of lines of charge laid down by each horizontal scan of the light modulating medium by the beam of electrons. Such lines of charge laid down by the first horizontal scan in the first field are designated 1A1 and 1A2, the first numeral indicating the field, the letter indicating the lines of scan and the numerical subscript indicates the line of charge in the scan. Similarly, the lines of charge laid down in the first field by the second horizontal scan and designated 1B1 and 1B2, the spacing of the lines of charge in each pair is one-half the normal spacing were a single beam utilized. The dotted lines designated 2A1 and 2A2 represent the charge laid down by the first horizontal scan in the second field, the numeral 2 indicating the second field, the designation A indicating the first line and the subscript indicating the first and second lines of charge in a pair. In the second field lines of charge in each pair are also spaced one-half the spacing in a field of scan utilizing just a single beam of electrons. The designation 2B1 and 2B2 indicate the charge laid down by the second horizontal scan of the electron beam in the second field. In this figure the lines of scan of the first and second field are interlaced so that the lines of charge laid down by a horizontal scan in the second field coincides with the adjacent lines of charge laid down by successive lines of scan in the first field. For example, the line of charge 2A1 coincides in position in the light modulating medium with the line of charge 1A2. While such lines of charge are shown in the figure as slightly displaced, such is shown only for the purpose of illustration.

Accordingly, it is seen that in accordance with the present invention the grating line spacing of the green diffraction grating is made one-half of what would be the arrangement were the natural scanning lines of a field used as the green diffraction grating. Such a grating now has a density comparable to the red and blue diffraction gratings which will be described below, thereby enabling the rise and fall time of the deformations of the green diffraction grating to be made comparable to the rise and fall time of the red and blue grating with the advantages indicated above. Also with such a provision lines of charge are formed in the same locations in each of the two fields thereby avoiding the adverse effects produced in the light modulating medium when the lines of charge in a field are laid on the residual peaks of a preceding field.

The green diffraction grating is controlled in amplitude by deflecting the electron scanning beam at a very high frequency, nominally at about 48 megacycles, in the vertical direction, i.e., perpendicular to the direction of the lines to produce a uniform spreading out or smear of the charge transverse to the scanning direction of the beam. The amplitude of the smear in such direction varies proportionally with the amplitude of the high frequency carrier signal which amplitude varies inversely with the amplitude of the green video signal. The frequency chosen is higher than either the red or blue frequency to avoid the undesired interaction with signals of other frequencies of the system including the video signals and the red and blue carrier waves, as will be more fully explained below. With low amplitude modulation of the carrier wave more charge is concentrated in a line along the center of lines of charge than with high amplitude modulation thereby producing a greater deformation in the light modulating medium at that part of the line. In short, the grating formed by the focused beam represents maximum green video signal or light field, and the defocusing by the high frequency carrier deteriorates or smears such grating under conditions of minimum green video signal. For this dark field the grating is virtually wiped out.

Figure 2B:
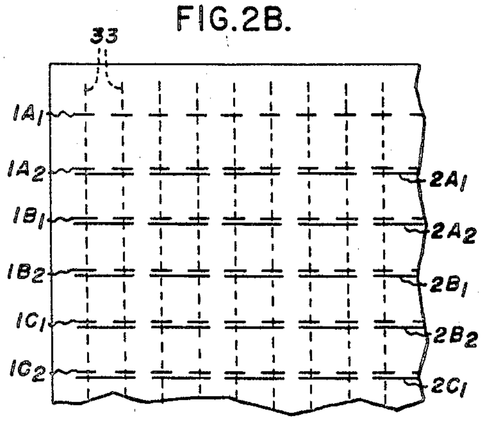

In FIGURE 2B is shown in schematic form a portion of the raster in the light modulating medium along with the diffraction grating corresponding to the red color component. The horizontal dash lines designated as in FIGURE 2A represent the pairs of lines of charge laid down by each horizontal scan of each field of the raster. The spaced vertically oriented dotted lines 33 on each of the raster lines, i.e., extending across the raster lines schematically represent concentrations of charge laid down by an electron beam to form the red diffraction grating in a manner to be described hereinafter, such concentrations occurring at equally spaced intervals on each line, corresponding parts of each scanning line having similar concentrations thereby forming a series of lines of charge equally spaced from adjacent lines which cause the formations of valleys in the light modulating medium, the depth of such valleys, of course, depending upon the concentration of charge. Such a result is produced by a signal superimposed on an electron beam moving horizontally at a frequency 15,735 cycles per second, a carrier wave, of smaller amplitude but of fixed frequency of the order of 16 megacycles per second thereby producing a line to line spacing in the grating of approximately 1/760 of an inch. The high frequency carrier wave causes a velocity modulation of the beam thereby causing the beam to move in steps, and hence to lay down the pattern of charge schematically depicted in this figure with each line or valley extending in the vertical direction and adjacent lines or valleys being spaced apart by a distance determined by the carrier frequency producing the lines.

Figure 2C:
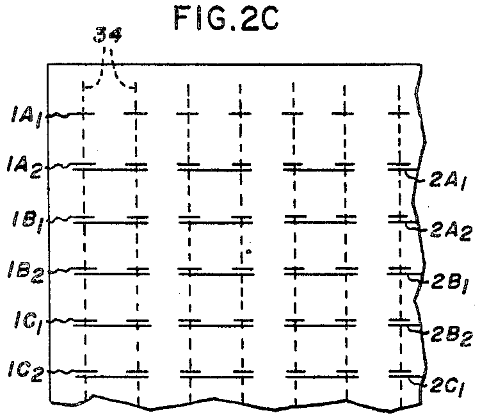

In FIGURE 2C is shown a section of the raster on which the blue diffraction grating has been formed. As in the case of the red diffraction grating the vertically oriented dotted lines 34 of each of the pairs of lines of charge laid down by each horizontal scan of each of the fields represents concentrations of charge laid down thereby. The grating line to line spacing is uniform, and the amplitude thereof varies in accordance with the amount of charge present. The blue grating is formed in a manner similar to the manner of formation of the red grating, i.e., a carrier frequency of amplitude smaller than the horizontal deflection wave is applied to produce a velocity modulating in the horizontal direction of the electron beam, at that frequency rate, thereby to lay down charges on each line that are uniformly spaced with the line to line spacing being a function of the frequency. A suitable frequency is nominally 12 megacycles per second.

As used in this specification with reference to the specific raster area of the light modulating medium, a point represents an area of the order of several square mils and corresponds to a picture element. For the faithful reproduction or rendition of a color picture element three characteristics of light in respect to the element need to be reproduced, namely, luminance, hue, and saturation. Luminance is brightness, hue is color, and saturation is fullness of the color. It has been found that in general a system such as the kind under consideration herein that one grating line is adequate to function for proper control of the luminance characteristic of a picture element in the projected image and that about three to four lines are a minimum for the proper control of hue and saturation characteristics of a picture element.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of the color components in a beam of light. The line to line spacing of the grating controls the deviation, and hence color component selection, and the amplitude of the grating controls the intensity of such component. In the specific system under consideration herein substantially the first and second diffraction orders of light are utilized in the red and blue primary color channels, and the first and third diffraction orders of light are used in the green primary color channel. The manner in which the instantaneous efficiency of the first, second and third orders vary with depth of deformation, and also the manner in which the sums of various ones of the orders varies with depth of deformation are described in connection with FIGURES 6 and 7. The manner in which the average efficiency for combinations of various ones of the first, second and third orders varies with depth of deformation will be described in detail in connection with FIGURE 8.

Referring again to FIGURE 1, an electron writing system is provided for producing the phase diffraction gratings in the light modulating medium, and comprises an evacuated enclosure 40 in which are included an electron beam device 11 having a cathode 35, a control electrode 36, and a first anode 37 having a pair of vertically positioned holes 38 and 39 to produce a pair of vertically positioned components in the electron beam from cathode 35, a pair of vertical deflection plates 41, and a pair of horizontal deflection plates 42, a set of vertical focus and deflection electrodes 43, a set of horizontal focus and deflection electrodes 44, and the light modulating medium 10. The cathode 35, control electrode 36, and first anode 37 along with the transparent target electrode 48 supporting the light modulating medium 10 are energized from a source 46 to produce in the evacuated enclosure an electron beam having two components that at the point of focusing on the light modulating medium is of small dimensions, each component having a cross section of the order of a mil, and of low current (a few microamperes), and high voltage (about 8 kilovolts). Electrodes 41 and 42, connected to ground through respective high impedances **68*a*, 68*b*, 68*c*, and 68*d* provide a deflection and focus function, but are less sensitive to applied deflection voltages than electrodes 43 and 44. The electrodes 43 and 44** control both the focus and deflection of the electron beam in the light modulating medium in a manner to be more fully explained below.

A pair of carrier waves which produce the red and blue gratings, in addition to the horizontal deflection voltage are applied to the horizontal deflection plates 44. The electron beam, as previously mentioned, is deflected in steps separated by distances in the light modulating medium which are a function of the grating spacing and of the desired red and blue diffraction gratings. The period of hesitation at each step is a function of the amplitude of the applied signal corresponding to the red and blue video signals. A high frequency carrier wave modulated by the green video signal, in addition to the vertical sweep voltage, is applied to the vertical deflection plates 41 to spread the beam out in accordance with the amplitude of the green video signal as explained above. The viscous light modulating medium 10 is supported on transparent member 45 coated with a transparent conductive layer 48 adjacent the medium such as indium oxide. The viscosity and other properties of the light modulating medium are selected such that the deposited charges produce the desired deformations in the surface and such that the amplitude of the deformations decay to a small value after each field of scan thereby permitting alternate variations in amplitude of the diffraction grating at the sixty cycle per second field scanning rate to be described in greater detail in connection with FIGURE 9. The conductive layer is maintained at ground potential and constitutes the target electrode for the electron writing system. Of course, in accordance with television practice the control electrode is also energized after each horizontal and vertical scan of the electron beam by a blanking signal obtained from a conventional blanking circuit (not shown).

Above the evacuated enclosure 40 are shown in functional blocks the source of the horizontal deflection and beam modulating voltages which are applied to the horizontal deflection plates to produce the desired horizontal deflection. This portion of the system comprises a source of red video signal 50, and a source of blue video signal 51 each corresponding, respectively, to the intensity of the respective primary color component in a television image to be projected. The red video signal from the source 50 and a carrier wave from the red grating frequency source 52 are applied to the red modulator 53 which produces an output in which the carrier wave is modulated by the red video signal. Similarly, the blue video signal from source 51 and carrier wave from the blue grating frequency source 54 is applied to the blue modulator 55 which develops an output in which the blue video signal amplitude modulates the carrier wave. Each of the amplitude modulated red and blue carrier waves are applied to an adder 56 the output of which is applied to a push-pull amplifier 57. The output of the amplifier 57 is applied to the horizontal plates 44. The output of the horizontal deflection sawtooth source 58 is also applied to plates 44 and to plates 42 through capacitors **49*a* and 49*b***.

Below the evacuated enclosure 40 are shown in block form the circuits of the vertical deflection and beam modulation voltages which are applied to the vertical deflection plates to produce the desired vertical deflection. This portion of the system comprises a source of green video signal 60, a green grating or wobbulating frequency source 61 providing high frequency carrier energy, and a modulator 62 to which the green video signal and carrier signal are applied. An output wave is obtained from the modulator having a carrier frequency equal to the carrier frequency of the green grating frequency source and an amplitude varying inversely with the amplitude of the green video signal. The modulated carrier wave and the output from the vertical deflection source 63 are applied to a conventional push-pull amplifier 64, the output of which is applied to vertical plates 43 to produce deflection of the electron beam in the manner previously indicated. The output of the vertical deflection sawtooth source 63 is also applied to the plates 43 and to plates 41 through capacitors **49*c* and 49*d***.

A circuit for accomplishing the deflection and focusing functions described above in conjunction with the deflection and focusing electrode system comprising two sets of four electrodes such as shown in FIGURE 1 is shown and described in copending patent applications Ser. No. 335,117, filed Jan. 2, 1964, now abandoned and Ser. No. 471,993, filed July 14, 1965, now U.S. Patent No. 3,320,468 both assigned to the assignee of the present invention. An alternative electrode system and associated circuit for accomplishing the deflection and focusing function is described in the aforementioned copending patent application Ser. No. 343,990 now U.S. Patent No. 3,272,917.

As mentioned above the red and blue channels make use of the vertical slots and bars and the green channel makes use of the horizontal slots and bars. The width of the slots and bars, in one arrangement or array is one set of values and the width of the slots and bars in the other arrangement is another set of values. The raster area of the modulating medium may be rectangular in shape and has a ratio of height to width or aspect ratio of three to four in accordance with television standards in force in the United States. The center-to-center spacing of slots in the horizontal array is made three times the center-to-center spacing of the slots in the vertical array. Each of the lenticules in each of the lenticular plates are proportioned, i.e., with height to width ratio of three to four. The lenticules in each plate are stacked into horizontal rows and vertical columns. Each of the lenticules in one plate are of one focal length and each of the lenticules on the other plate are of another focal length. The filter element may be constituted to have three sections registering light of red and blue color components in the central portion of the input mask and green light in the side sector portions as will be apparent from considering FIGURE 3.

Figure 3:
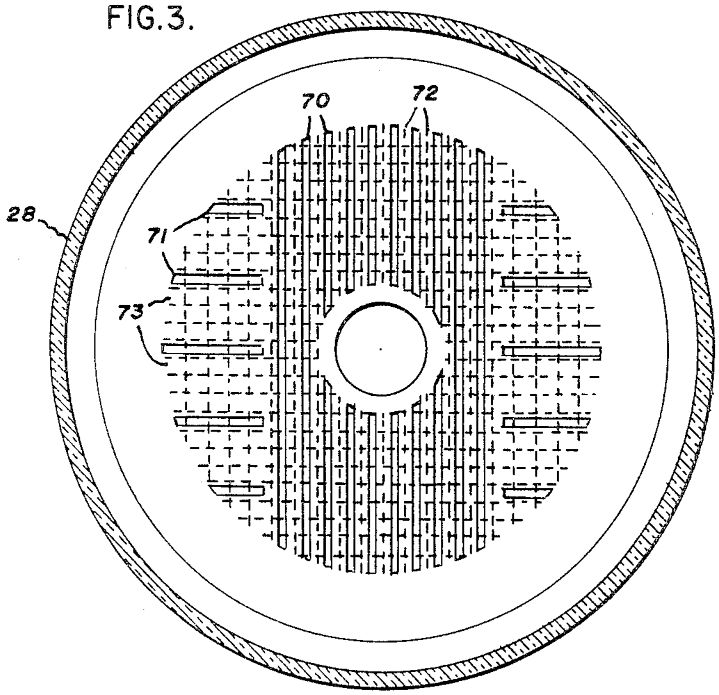
FIGURE 3 is an end view taken along section 3—3 of the system of FIGURE 1 showing the second lenticular lens plate and the input mask thereof of the system of FIGURE 1 in accordance with the present invention.

In FIGURE 3 is shown a view of the face of the second lenticular lens plate and input mask 28 as seen from the raster area of the modulating medium or along section 3—3 of FIGURE 1. In this figure the vertical oriented slots 70 are utilized in the controlling of the red and blue light color components in the image to be projected. The horizontally extending slots 71 located in the sector area in the input mask on each side of the central portion thereof function to cooperate with the light modulating medium and light output mask to control the green color component in the image to be projected. The ratio of the center to center spacing of the horizontal slots 71 to the center to center spacing of the vertical slots 70 is three to one. The rectangular areas enclosed by the vertical and horizontal dash lines 72 and 73 are the boundaries for the individual lenticules appearing on the opposite face of the plate 28. The focal length of each of the lenticules is the same. The center of each of the lenticules lies in the center of an element of a corresponding slot.

Figure 4 shows the first lenticular lens plate 27 taken along section 4—4 of FIGURE 1 with horizontal rows and vertical columns of lenticules 74. Each of the lenticules of this plate cooperates with a correspondingly positioned lenticule on the second lenticular lens plate shown in FIGURE 3 in the manner described above. Each of the lenticules on plate 27 have the same focal length which is different from the focal length of the lenticules on the second lenticular plate 28.

FIGURE 5 shows the light output mask 31 of FIGURE 1 taken along section 5—5 thereof. This mask consists of a plurality of transparent slots 75 and opaque bars 76 in a central vertically extending section of the mask and a plurality of transparent slots 77 and opaque bars 78 in each of two segments of the spherical mask lying on each side of the central portion thereof. As mentioned previously the slots and bars from the output mask are in a predetermined relationship to the slots and bars of the input mask. As the grating density of the green grating is now twice the density in the arrangement wherein a single beam is utilized the diffraction angle is now twice as large. In the aforementioned patent application Ser. No. 490,498 the slots and bars associated with the green channel are made correspondingly twice as large. In accordance with the present invention the slots and bars of the output mask associated with the green channel are made about four times as large for reasons to be described in detail in connection with FIGURES 9A and 9B.

Figure 6:
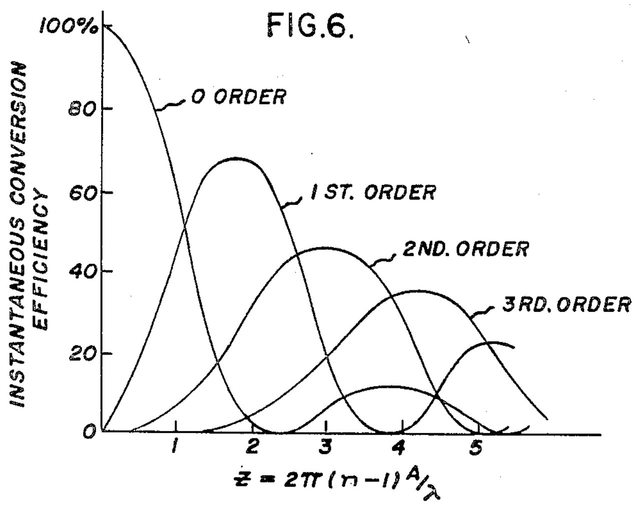
FIGURE 6 shows graphs of the instantaneous conversion efficiency of the light diffracting gratings formed in the light modulating medium as a function of the depth of modulation or deformation for various diffraction orders.

Referring now to FIGURE 6 there are shown graphs of the instantaneous conversion efficiency of the light diffracting grating formed in the light modulating medium as a function of the depth of modulation or deformation of the light modulating medium for various diffraction orders. In this figure instantaneous conversion efficiency for light directed on to the light modulating medium is plotted along the ordinate in percent and the deformation function Z, where $$Z=2\pi(n-1)\frac{h}{\lambda}$$

is plotted along the abscissa. In the above relationship $h$ represents peak to peak amplitude or depth of deformation, $\lambda$ represents the wave-length of light involved and $n$ represents the refractive index of the light modulating medium. Graphs 80, 81, 82, and 83 show such relationships for the zero, the first, the second, and the third orders of diffracted light, respectively. In connection with this figure it is readily observed that when the light modulating medium is undeformed that all of the light is concentrated in the zero order which represents the undiffracted path of the light. Of course, the light passing through the light modulating medium would be deviated slightly by refraction of the light modulating medium as normally the index of refraction of the light modulating medium is different from the index of refraction of vacuum or air surrounding the medium, and is conveniently selected to be approximately in the range of refraction indices of the material of the various vitreous optical elements utilized in the system. The output mask is positioned in relationship to the input mask such that when the light modulating medium is undeformed the slots of the input mask are imaged on the bars of the output mask and thus the slight refraction effects that occur are allowed for. As the depth of modulation for a given grating is increased progressively more light appears in the various diffraction orders higher than the zero order. Typically the maximum depth of modulation is about 1.0 microns. Progressively as the peak efficiency of the first, second and higher orders of light is reached the value of the maximum efficiency of the higher order of light becomes progressively smaller. As can be readily seen from the graphs the maximum efficiencies of light in the first order, second and third orders is approximately 67 percent, 47 percent, and 37 percent, respectively.

Figure 7:
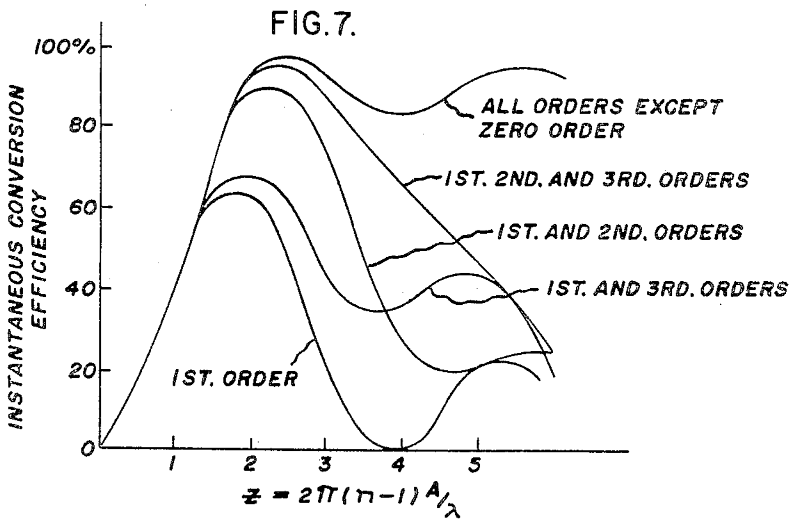
FIGURE 7 shows graphs of the instantaneous conversion efficiency of the light diffracting gratings formed in the light modulating medium as a function of the depth of modulation or deformation for various combinations of diffraction orders.

In FIGURE 7 are shown graphs of the instantaneous conversion efficiency versus Z, the function of the depth of modulation set forth above, for various combinations of diffraction orders. In this figure instantaneous conversion efficiency is plotted in percent along the ordinate, and the parameter Z is plotted along the abscissa. Graph 85 shows the manner in which the instantaneous conversion efficiency of the first order increases when the depth of modulation reaches a peak of approximately 67 percent and thereafter declines. Graph 86 shows the manner in which the instantaneous conversion efficiency for the sum of the first and second orders of diffracted light increases reaching a peak at approximately 93% and thereafter declines. Similarly, graph 87 shows the manner in which the instantaneous conversion efficiency of the diffraction grating varies for the sum of the first and third orders increases reaches a peak at approximately 69% and thereafter declines. Finally, graph 88 shows the manner in which the instantaneous conversion efficiency of the sum of the first, second and third orders of light increases to a peak of approximately 98% and thereafter declines. Graph 89 shows instantaneous conversion efficiency of the sum of all orders except the zero order.

Figure 8:
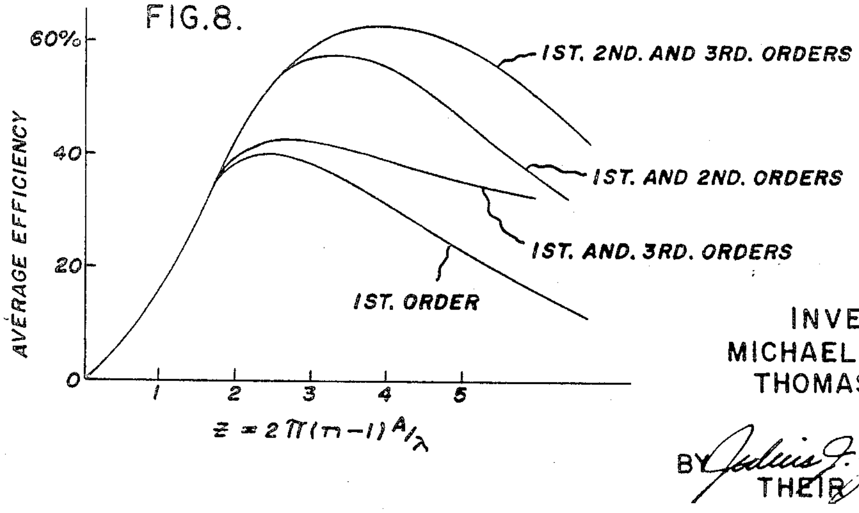
FIGURE 8 shows graphs of the average efficiency for linear decay of the light diffraction gratings formed in the light modulating medium as a function of the depth of modulation or deformation for various combinations of diffraction orders.

In FIGURE 8 are shown a group of graphs on the average conversion efficiency for the various combinations of diffraction orders as a function of the amplitude of deformation. The average conversion efficiency is represented in percent along the ordinate, and amplitude in terms of the aforementioned parameter Z is plotted along the abscissa. For the proper operation of the system of FIGURE 1 it is necessary for the light modulating medium to retain the diffraction deformations produced therein over a period comparable to the period of a scanning field. Ideally, each point of the light modulating medium should retain the deformation unattenuated until it is subject to a new deformation in response to the modulating signal. Practically, such an ideal situation cannot be met as the charge on the light modulating medium decays and thereby permits the diffraction patterns in the light modulating medium to decay. Under such practical conditions it is desirable for the deformations to decay to a small value over the period of a field of the television scanning process so that new deformation information can be applied to the light modulating medium. The average efficiency graphs of FIGURE 8 are based on the decay of the deformations to approximately one-third their initial value over the period of a field. Accordingly, even after the electron charge has been deposited by the electron beam to produce the deformation the existence of the deformation continues to diffract the light incident on the medium. Graphs 90, 91, 92, and 93 show, respectively, the average efficiency of the first diffraction order, the sum of the first and second orders, the sum of the first and third orders, and the sum of the first, second and third orders.

Referring now to FIGURE 9A there is shown a portion of the bars and slots of one of the side sections of the output mask of FIGURES 1 and 5 of the aforementioned patent application Ser. No. 490,498, filed Sept. 27, 1965. Conveniently three bars 100, 101 and 102 and two slots 103 and 104 are shown. More particularly this figure illustrates where the various diffraction orders of green light fall in relation to the slots and bars of the output mask. The horizontal distance of the diagram represents the vertical displacement of the various orders of green light in relation to the slots and bars in the output mask. The green color component is designated by the symbol G and the grating producing such diffraction order is indicated by the appropriate numerical subscript. The number in parentheses after the subscript denoting order denotes gratings of field or frame line density. The designation 262½ denotes diffraction grating of field line density, and the designation 525 designates the diffraction grating of frame line density. The designation $G_1$(262½) refers to first order light deviated by the residual diffraction grating of field line density. The designations $G_1$(525), and $G_2$(525) refer, respectively, to first and second order green light deviated by the diffraction grating produced by the frame line grating formed by the electron beam. As mentioned above the light from a particular slot in the input mask in the absence of modulation in the light modulating medium falls on a particular bar in the output mask. Such a condition is represented by the lines $G_0$ where the separation of such lines bear a definite relation to the width of the slot source. As longer wavelengths are deviated more for a fixed line spacing, the longer wavelengths of green light are deviated more. Also, the progressively higher orders of green light are deviated more by the factor of the order of that light. Thus the second order green component is deviated twice the amount of the first order of green component, and so on. Accordingly, the spacial spread of the green source is progressively greater for higher order and for bands of longer wavelengths. Such increase widths effects for reasons of clarity have not been shown in FIGURE 9A, and FIGURE 9B, as well.

As explained above the grating associated with the green primary color component is formed by using the horizontal scan lines of a field. The electron beam in its horizontal scan is modulated by a very high frequency carrier wave, for example, 48 megacycles to produce a smear of charge in the vertical direction. Under zero video modulation of the carrier wave the charge is completely smeared over the raster thereby reducing to a minimum any deformations in the modulating medium. The amount of smear is progressively decreased with increasing video signal thereby allowing the appearance of diffraction gratings. The center-to-center spacing of the slots or bars in the output mask for the green channel is three-halves the center-to-center spaces of the red and blue channels of the aforementioned patent application Ser. No. 490,498. Accordingly, in a system such as shown in FIGURE 1 with raster height being 0.82 inch and with a green center wavelength of 530 millimicrons, first order green light $G_1$(525) falls in slot 103, about one-third of second order green light $G_2$(525) is passed in slot 104. The slots 103 and 104 are made of sufficient width to obtain good passage of such light.

It has been found that in such a slot and bar system as illustrated in FIGURE 9A that a residual grating of field line density is formed and continuously maintained. Such a grating produces first order green light $G_1$(262½) which falls in slot 103 and impairs the green dark field of the system by the fact that the double electron beam in which the components thereof in the light modulating medium are separated by one-half the line-to-line spacing of a field are difficult to maintain in perfect alignment over the entire area scanned. Also non linearities exist in the vertical scan of the electron beam with the result that the residual grating of field line density is produced, and such adverse effects are overcome by the provision of input slots in the input mask as described above in connection with FIGURE 3, and output bars in the output mask as described in FIGURE 5, and as discussed in detail in FIGURE 9B.

FIGURE 9B shows a portion of one of the side sections of FIGURE 5 in accordance with the present invention in which is included a pair of bars 105 and 106 separated by a slot 107. The horizontal coordinate represents the vertical displacement of the various orders of green light produced by the grating lines of field and frame line density as well as the zero order light, and are designated as in FIGURE 9A. In this figure one-half as many bars are utilized as in the arrangement of FIGURE 9A. The bars are of equal width and the slots are of equal width. The bars are made essentially twice as wide as the bars of FIGURE 9A, and also the slots of FIGURE 9B are made approximately twice as wide as the figure of 9A. The important requirement is that the bars be made sufficiently wide to block the light deviated by the residual grating of field line density. Of course, the corresponding changes are made in the input mask such that there is provided a sufficient number of slot sources for the bars as described in connection with FIGURE 3. Accordingly, in the system such as shown in FIGURE 1 first order green light of field line density $G_1$(262½) now falls on bar 105, first order green light of frame light density $G_1$(525) falls in slot 107, second order green light $G_2$(525) also falls in slot 107, and green light $G_1$(262½) is blocked by bar 105. Accordingly, with the system of FIGURE 9B it is apparent that dark field of the green channel is increased by elimination of light deviated by the residual green grating of field line density. As the system utilizes first and second orders of deviated light of the principal diffraction grating of frame line density the average light transmission efficiency is maintained while good dark field conditions are obtained in the system.

While the invention has been described in specific embodiments, it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. A system for controlling point by point the intensity of a beam of light for projecting an image in response to an electrical signal correspondnig to said image comprising:

a layer of light modulating fluid deformable by electric charges deposited thereon, means for directing said beam of light on said layer, means for directing a beam of electrons upon said layer to deposit such charges on said layer, means to deflect said electron beam over said layer in one direction in successive lines at an intermediate frequency rate and in another direction perpendicularly to said one direction at a low frequency rate to form a raster thereon consisting of a frame of two fields, the lines of one field of which are interlaced with the lines of the other thereof, said electron beam having two components displaced from one another in said one direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field, said lines of charge in each field being substantially superimposed, means for modulating said beam of electrons in said other direction by a fixed high frequency carrier wave modulated inversely in amplitude by said electrical signal corresponding to the intensity of light in an image to be projected to modulate the amplitude of the diffraction grating in accordance with the amplitude of said signal.

the properties of the fluid being such that the rise and fall of deformations due to the differential charge on said media is comparable to a field of scan, a light and optical system for projecting light as a function of the deformations in said fluid layer including a mask having a set of parallel slots and bars parallel to said direction of line scan, said slots and bars being positioned and of lateral extent in an image surface to pass first and second order light diffracted by said diffraction grating of twice field scan line density and to block first order light diffracted by any grating of field scan line density.

2. A system for controlling point by point the intensity of a beam of light for projecting an image in response to an electrical signal corresponding to said image comprising:

a layer of light modulating fluid deformable by electric charges deposited thereon, means for directing said beam of light on said layer, means for directing a beam of electrons upon said layer to deposit such charges on said layer, means to deflect said electron beam over said layer in one direction in successive lines at an intermediate frequency rate and in another direction perpendicularly to said one direction at a low frequency rate to form a raster thereon, said electron beam having two components displaced from one another in said one direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field, means for modulating said beam of electrons in said other direction by a fixed high frequency carrier wave modulated inversely in amplitude by said electrical signal corresponding to the intensity of light in an image to be projected to modulate the amplitude of the diffraction grating in accordance with the amplitude of said signal, the properties of the fluid being such that the rise and fall of deformations due to the differential charge on said media is comparable to a field of scan, a light and optical system for projecting light as a function of the deformations in said fluid layer including a mask having a set of parallel slots and bars parallel to said direction of line scan, said slots and bars being positioned and of lateral extent in an image surface to pass first and second order light diffracted by said diffraction grating of twice field scan line density and to block first order light diffracted by any grating of field scan line density.

3. In a projection system the combination of:

a layer of light modulating fluid deformable by electric charges deposited thereon, means for directing a beam of electrons upon said layer to deposit such charges on said layer, means to deflect said electron beam over said layer in one direction in successive lines at an intermediate frequency rate and in another direction perpendicularly to said one direction at a low frequency rate to form a raster thereon consisting of a frame of two fields, the lines of one field of which are interlaced with the lines of the other thereof, a plurality of spaced parallel slot sources of light parallel to said direction of light scan directing light on said layer, said electron beam having two components displaced from one another in said one direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field, said lines of charge in each field being substantially superimposed, means for modulating said beam of electrons in said other direction by a fixed high frequency carrier wave modulated inversely in amplitude by said electrical signal corresponding to the intensity of light in an image to be projected to modulate the amplitude of the diffraction grating in accordance with the amplitude of said signal, the properties of the fluid being such that the rise and fall of deformations due to the differential charge on said media is comparable to a field of scan, a mask having a plurality of transparent slots parallel to one another separated by opaque bars parallel to said direction of line scan, means for imaging each of said slot sources on a respective bar in the absence of a diffraction grating in said medium, said slots and bars being positioned and of lateral extent in an image surface to pass first and second order light diffracted by said diffraction grating of twice field scan line density and to block first order light diffracted by any grating of field scan line density.

4. In a projection system the combination of:

a layer of light modulating fluid deformable by electric charges deposited thereon, means for directing a beam of electrons upon said layer to deposit such charges on said layer, means to deflect said electron beam over said layer in one direction in successive lines at an intermediate frequency rate and in another direction perpendicularly to said one direction at a low frequency rate to form a raster thereon consisting of a frame of two fields, the lines of one field of which are interlaced with the lines of the other thereof, a plurality of spaced parallel slot sources of light parallel to said direction of line scan directing light on said layer, said electron beam having two components displaced from one another in said one direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field, said lines of charge in each field being substantially superimposed, means for modulating said beam of electrons in said other direction by a fixed high frequency carrier wave modulated inversely in amplitude by said electrical signal corresponding to the intensity of light in an image to be projected to modulate the amplitude of the diffraction grating in accordance with the amplitude of said signal, the properties of the fluid being such that the rise and fall of deformations due to the differential charge on said media is comparable to a field of scan, a mask having a plurality of transparent slots parallel to one another separated by opaque bars parallel to said direction of line scan, means for imaging each of said slot sources on a respective bar in the absence of a diffraction grating in said medium, said slots and bars being positioned and of lateral extent in an image surface to pass first and second order light diffracted by said diffraction grating of twice field scan line density and to block first order light diffracted by any grating of field scan line density, each of the slots of said mask being of the same width and each of the bars of said mask being of the same width.

5. A system for controlling point by point the intensity of a beam of light for projecting an image in response to an electrical signal corresponding to said image comprising:

a layer of light modulating fluid deformable by electric charges deposited thereon, means for directing said beam of light on said layer, means for directing a beam of electrons upon said layer to deposit such charges on said layer, means to deflect said electron beam over said layer in one direction in successive lines at an intermediate frequency rate and in another direction perpendicularly to said one direction at a low frequency rate to form a raster thereon consisting of a frame of two fields, the lines of one field of which are interlaced with the lines of the other thereof.

said electron beam having two components displaced from one another in said one direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field, said lines of charge in each field being substantially superimposed, means for modulating said beam of electrons in said other direction inversely in amplitude by said electrical signal corresponding to the intensity of light in an image to be projected to modulate the amplitude of the diffraction grating in accordance with the amplitude of said signal, the properties of the fluid being such that the rise and fall of deformations due to the differential charge on said media is comparable to a field of scan, a light and optical system for projecting light as a function of the deformations in said fluid layer including a mask having a set of parallel slots and bars parallel to said direction of line scan, said slots and bars being positioned and of lateral extent in an image surface to pass first and second order light diffracted by said diffraction grating of twice field scan line density and to block first order light diffracted by any grating of field scan line density.

6. A system for controlling point by point the intensity of a beam of light for projecting an image in response to an electrical signal corresponding to said image comprising:

a layer of light modulating fluid deformable by electric charges deposited thereon, means for directing said beam of light on said layer, means for directing a beam of electrons upon said layer to deposit such charges on said layer, means to deflect said electron beam over said layer in one direction in successive lines at an intermediate frequency rate and in another direction perpendicularly to said one direction at a low frequency rate to form a raster thereon consisting of a frame of two fields, the lines of one field of which are interlaced with the lines of the other thereof, said electron beam having two components displaced from one another in said one direction and conjointly controlled whereby each line of scan in said one direction provides a pair of lines of charge on said medium, corresponding lines in successive pairs of lines of charge being displaced by twice the separation of lines of charge in a pair, whereby a diffraction grating is formed on said layer having lines of deformation directed in said one direction twice the density of a diffraction grating formed by the lines of scan of a field, said lines of charge in each field being substantially superimposed, means for modulating said beam of electrons in said other direction in amplitude by said electrical signal corresponding to the intensity of light in an image to be projected to modulate the amplitude of the diffraction grating in accordance with the amplitude of said signal, the properties of the fluid being such that the rise and fall of deformations due to the differential charge on said media is comparable to a field of scan, a light and optical system for projecting light as a function of the deformations in said fluid layer including a mask having a set of parallel slots and bars parallel to said direction of line scan, said slots and bars being positioned and of lateral extent in an image surface to pass first and second order light diffracted by said diffraction grating of twice field scan line density and to block first order light diffracted by any grating of field scan line density.

References Cited

UNITED STATES PATENTS 3,305,630 2/1967 Good -------------- 178—5.4

ROBERT L. GRIFFIN, *Primary Examiner.*

H. W. BRITTON, *Assistant Examiner.*

U.S. Cl. X.R.

88—61; 178—5.4